Patented Sept. 6, 1949

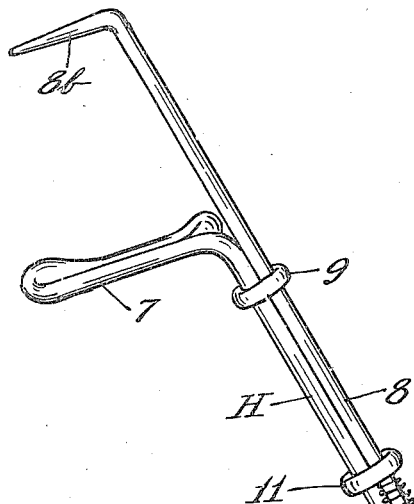
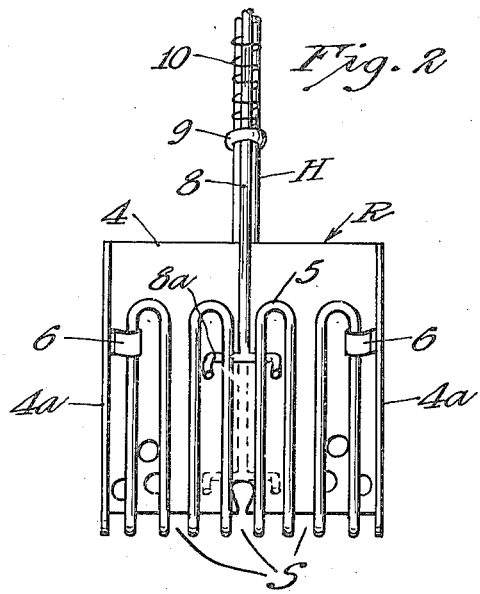
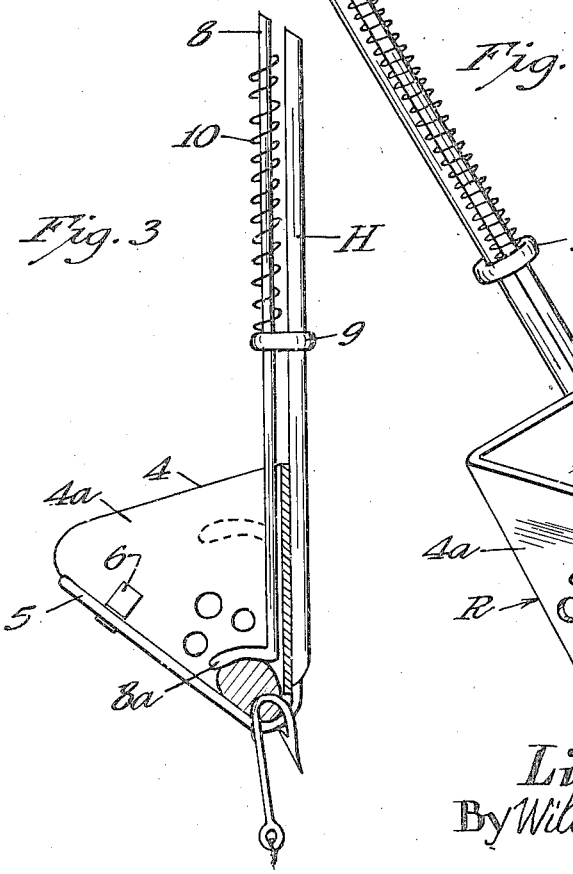
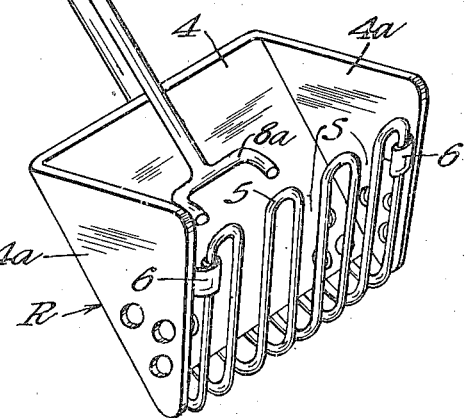

2,480,924

UNITED STATES PATENT OFFICE 2,480,924

DIP DEVICE FOR MINNOWS AND THE LIKE

Linus H. Heger, Hopkins, Minn., assignor to Kenneth J. Heger, Oxboro, Minn.

Application March 27, 1944, Serial No. 528,200

3 Claims. (Cl. 43—4)

This invention relates to dip devices for use by fishermen in catching and holding minnows and other aquatic bait.

Small dip nets and reticulated metal dippers have heretofore been widely used for extracting minnows from a bait bucket, but after this operation the fisherman was required to hold the minnow and then secure the hook through the same for fishing, the minnows and other aquatic bait, such as crawfish, shrimp or the like being very slippery and hard to hold in position for hooking. In fishing in warm weather difficulty is encountered in baiting the hook, but in ice fishing in cold temperatures this difficulty is increased with material discomfort on the part of the fisherman because of the icy water on the minnow and the difficulty with numb fingers in holding the minnow, or the bait, for attaching the same to the hook.

It is an object of my invention to provide a dip device which may be used in conjunction with water-containing bait pails for readily catching a minnow or other aquatic live bait and which further retains or holds the live bait with provision for inserting the hook through the same while so holding.

More specifically it is an object to provide a dip device of the class described comprising a reticulated dip receptacle having a trough-like portion in the bottom thereof and provided with a handle for manipulating the same and further provided with means operated from the outer end of the handle for gripping and retaining the minnow or other bait in conjunction with the trough portion whereby through the medium of slots in one side of the receptacle a fishing hook may be applied and the minnow then released from the dip device.

These and other objects and advantages of my invention will be more apparent from the following description made in connection with the accompanying drawings, wherein like reference characters refer to the same parts throughout the several views, and in which—

Figure 1 is a perspective view showing an embodiment of my invention in a somewhat inclined position;

Figure 2 is a front elevation of the same with most of the handle broken away; and Figure 3 is a longitudinal vertical section taken through the device.

In the embodiment illustrated my dip device comprises a trough-like reticulated receptacle designated as an entirety by the letter R having a substantially flat downwardly converging back wall 4 and V-shaped end walls 4a which may be integrally constructed with the back wall. The back wall and end walls 4a are preferably formed from sheet metal which will take welding or solder and which further is either of a nature or properly coated to resist oxidation. The back wall 4, it will be noted (see Figure 3), terminates short of the lower edges of the side walls 4a for a purpose which will later be made clear. The lower portions of walls 4 and 4a are preferably provided with a plurality of small apertures.

The front wall of my receptacle in the form shown comprises a grating 5 preferably constructed from a single tortuously bent rod or stiff wire, the spaced relation between the several sections of the grating being sufficiently close to prevent escape of a minnow or other aquatic live bait therethrough. The grating 5, as shown, has its main or body portion lying substantially in a plane but has its lower edge upwardly bent in substantial configuration with the rounded lower ends of the end walls 4a. The extremities of the lower loops of the grating extend behind the lower edge of the rear wall 4 and are secured thereto by suitable means, such as spot welding.

The side edges of the grating 5 adjacent their upper portions are rigidly secured to the forward edges of the receptacle end walls 4a by suitable means such as angle brackets 6 which may be spot welded or otherwise secured to the inner sides of the end walls 4a.

An elongated rod handle H has its lower end spot welded or otherwise secured to the center of the rear wall 4 of the receptacle, extends upwardly for some distance, say from six inches to a foot and has its upper end bent outwardly to form a hand grip 7. A straight gripper rod 8 is disposed in parallel relationship at the forward side of handle H and rear wall 4 and as shown is guided for reciprocating movement by a pair of suitable eye guides 9 which are shaped substantially in the form of a figure eight and have one of the loop portions of each member welded or otherwise rigidly secured on intermediate parts of the handle H. Gripper rod 8 is considerably longer than handle H and has its lower end normally disposed in an intermediate position relative to the height of the rear wall 4 of the receptacle, carrying at its lower end as shown a bifurcated gripping head 8a, the prongs of which are outturned forwardly to cooperate with the trough like bottom of the receptacle when gripping a minnow or article of bait.

The gripper rod 8 is urged upwardly to its normal position as shown by a coil spring 10 surrounding an intermediate portion of the rod and interposed between the lower eye guide 9 and an eye guide 11 of also figure eight shape, its outer eye portion fixed to the gripper rod 8 with its opposite eye portion freely sliding upon the rod H. The upper end of the rod 8 projects normally a short distance above the hand piece 7 of the handle and has a thumb piece 8b bent rearwardly substantially in vertical alignment with the hand piece 7 to facilitate cooperative manipulation of the gripper rod.

Referring again to the construction of the front wall of my receptacle R in the form of a grating, it will be noted that three upwardly extending slots S are formed between loops or convolutions of the grating, extending from the lower edge of the rear wall 4 around the bottom of the device and then upwardly to the upper edge of the grating.

In using my device the receptacle is dipped into a minnow pail or the like and then raised quickly to trap and catch a minnow. Thereafter or at the time of lifting the device from the pail, the thumb piece 8b is depressed without removing the operator's hand from the hand piece 7 and in so doing grips or clamps the minnow lightly between the bifurcated gripping head 8a and the trough-like narrow bottom of the receptacle. The minnow, or other live bait, is thus held in full, out-stretched position and thereafter a fish hook may be inserted at the bottom of any one of the slots S through the minnow behind the dorsal fin or if desired adjacent the head or tail depending on the slot utilized. Pressure on the gripper rod 8 may then be released and the minnow impaled upon the hook may be readily withdrawn from the receptacle, the shank of the hook moving through one of the upwardly extending opening slots.

It will, of course, be understood that while I prefer to form the front wall of the receptacle as an open slotted grating, this wall may be in the form of reticulated metal and having a central slot extending from the bottom of the receptacle upwardly through the upper edge of the wall.

From the foregoing description it will be seen that I have provided a compact, comparatively inexpensive but highly efficient dip device for effectively carrying out the purposes enumerated herein. With my device minnows, or other aquatic animals to be used as bait for fishing may be readily caught and removed from the water-containing bait pail and thereafter conveniently held and hooked without removing the same from the receptacle of the dip device and without the fisherman handling the minnow or getting his hands covered with water.

It will, of course, be understood that various changes may be made in the form, details, arrangements and proportions of the parts without departing from the scope of my invention.

The term reticulated as used herein and in the appended claims, is intended to include the provision of openings, apertures, netting or grating which will render the receptacle highly porous and offer little restriction to submerging of the receptacle in the water.

What I claim is:

1. A dip device for catching and holding aquatic live bait comprising an open-work dip receptacle having a handle extending therefrom, said receptacle having a back wall, a front wall and end walls and a movable gripping element mounted within said receptacle for cooperating with the lower portion of said receptacle to engage and hold a bait, said receptacle having a slot extending upwardly from the lower portion thereof, and said slot being open at its upper end whereby a bait held in said receptacle may have a hook applied thereto and whereby said hook with the bait impaled thereon may be removed from said receptacle.

2. A dip device for catching and holding minnows and the like, comprising a foraminous dip receptacle having an open top and having front and rear substantially planar walls rigidly secured together and converging at the bottom of said receptacle to form a substantially straight trough and triangular ends, a handle extending upwardly from the top of said receptacle, and a movable gripping element opposed to said trough to engage and hold one minnow whereby other minnows caught in said receptacle may be released from the open top of said receptacle and the one gripped utilized for bait.

3. The structure set forth in claim 2 and one of said walls having a plurality of slots extending upwardly from said trough to the upper edge of said receptacle and open at their upper ends whereby a gripped minnow may have a hook applied thereto and whereby the hook with the bait impaled thereon may be removed.

LINUS H. HEGER.

REFERENCES CITED

The following references are of record in the file of this patent:

UNITED STATES PATENTS

| Number | Name | Date |
|---|---|---|
| 1,158,637 | Chorvath | Nov. 2, 1915 |
| 1,749,472 | DePaemelaere | Mar. 4, 1930 |
| 2,082,754 | Peterson | June 1, 1937 |

FOREIGN PATENTS

| Number | Country | Date |
|---|---|---|
| 5,347 | Great Britain | 1884 |

OTHER REFERENCES

Webster's New International Dictionary, 2nd edition; W. A. Neilson, T. A. Knott, and P. W. Carhart, editors; G. & C. Merriam Co., publishers, Springfield, Mass., 1934. (A copy is in Division 2 of the U. S. Patent Office.)